United States Patent [19]
Yato et al.

[11] Patent Number: 6,084,831
[45] Date of Patent: Jul. 4, 2000

[54] APPARATUS AND METHOD OF AVERAGING DISK TRANSFER RATE INCLUDING DIVISION OF DISKS INTO DISKS ACCESSIBLE IN A RADIALLY INWARD DIRECTION AND DISKS ACCESSIBLE IN A RADIALLY OUTWARD DIRECTION

[75] Inventors: Shigeru Yato; Noboru Asamizuya, both of Kanagawa, Japan

[73] Assignee: Sony Corporation, Tokyo, Japan

[21] Appl. No.: 08/989,343

[22] Filed: Dec. 12, 1997

[30] Foreign Application Priority Data

Dec. 16, 1996 [JP] Japan .................................. 8-335669

[51] Int. Cl.$^7$ ................................... G11B 17/22
[52] U.S. Cl. ........................ 369/34; 369/178; 369/189; 369/197; 369/198; 369/240; 711/4; 711/168; 711/171; 711/173; 711/218; 711/114
[58] Field of Search ............................. 711/4, 168, 173, 711/171, 218, 217, 219, 114; 369/14, 15, 34, 178, 189, 197, 198, 240

[56] References Cited

U.S. PATENT DOCUMENTS

| | | | |
|---|---|---|---|
| 3,931,645 | 1/1976 | Dodd et al. | 360/135 |
| 5,081,616 | 1/1992 | Kitahara et al. | 369/47 |
| 5,506,825 | 4/1996 | Gushima et al. | 369/49 |

*Primary Examiner*—Hiep T Nguyen
*Attorney, Agent, or Firm*—Frommer Lawrence & Haug, LLP; William S. Frommer

[57] ABSTRACT

A disc control apparatus handles an even number of disc-shaped recording mediums run in rotation at a constant angular velocity and to which addresses are accorded for incrementing from an inner disc rim side or from an outer disc rim side. The disc control apparatus effectuates data accessing with the disc-shaped recording mediums in terms of a pre-set block as a unit. The control apparatus includes an accessing control unit which effectuates data accessing on the block basis by addressing from the outer disc rim side for one of the disc-shaped recording mediums of the set while effecting data accessing on the block basis by addressing from the inner disc rim side for the other disc-shaped recording medium of the set. During data recording/reproduction, one of two contiguous blocks is recorded/reproduced on the disc-shaped recording medium accessed from the outer disc rim side while the other block is recorded/reproduced on the disc-shaped recording medium accessed from the inner disc rim side. That is, one of the disc-shaped recording mediums of a set is recorded/reproduced from the outer disc rim side, while the other disc-shaped recording medium of the set is recorded/reproduced from the inner disc rim side, thereby assuring a uniform accessing speed, that is an averaged data transfer rate.

9 Claims, 5 Drawing Sheets ced data transfer rate.

APPARATUS AND METHOD OF AVERAGING DISK TRANSFER RATE INCLUDING DIVISION OF DISKS INTO DISKS ACCESSIBLE IN A RADIALLY INWARD DIRECTION AND DISKS ACCESSIBLE IN A RADIALLY OUTWARD DIRECTION

BACKGROUND OF THE INVENTION

1. Field of the invention

This invention relates to a disc controlling device for controlling a disc-shaped recording medium run in rotation at a constant angular velocity, such as a hard disc.

2. Description of Related Art

Heretofore, in a device adapted for controlling a disc-shaped recording medium, such as a hard disc, has an internal data transfer rate for the inner disc rim side different from that for the outer disc rim side. That is, since a hard disc is basically controlled for rotation to a constant angular velocity (CAV), the data transfer rate becomes higher on the outer disc rim side than that on the inner disc rim side. As an example, there is such a hard disc device in which the data transfer rate for the inner disc rim side and that for the outer disc rim side are 47.5 Mbps and 72 Mbps, respectively.

Thus, in designing a system employing a hard disc device, there is no alternative but to use the slower data transfer rate, that is the rate for the inner disc rim side, as a reference, or to use only a disc portion providing a faster data transfer rate, that is the outer disc rim side.

However, if the slower rate is used as a reference, system performance occasionally cannot be improved, whereas, if only the disc portion providing a faster rate is used, the hard disc cannot be exploited effectively.

SUMMARY OF THE INVENTION

It is therefore an object of the present invention to provide a disc control apparatus which is capable of assuring desired system performance and satisfying the cost lowering demand.

A disc control apparatus handles, as a set, an even number of disc-shaped recording mediums run in rotation at a constant angular velocity and to which addresses are accorded for incrementing from an inner disc rim side or from an outer disc rim side. The disc control apparatus effectuates data accessing with the disc-shaped recording mediums in terms of a pre-set block as a unit. The control apparatus includes an accessing control unit which effectuates data accessing on the block basis by addressing from the outer disc rim side for one of the disc-shaped recording mediums of the set while effectuating data accessing on the block basis by addressing from the inner disc rim side for the other disc-shaped recording medium of the set. During data recording/reproduction, one of two contiguous blocks is recorded/reproduced on the disc-shaped recording medium accessed from the outer disc rim side while the other block is recorded/reproduced on the disc-shaped recording medium accessed from the inner disc rim side. That is, one of the disc-shaped recording mediums of a set is recorded/reproduced from the outer disc rim side, while the other disc-shaped recording medium of the set is recorded/reproduced from the inner disc rim side thereby assuring a uniform accessing speed, that is an averaged data transfer rate.

According to the present invention, as described above, block-based data accessing by forward addressing, such as accessing from the outer disc rim side, is effected for one of the disc-shaped recording mediums of a set, while block-based data accessing by forward addressing, such as accessing from the inner disc rim side, is effected for the other disc-shaped recording mediums of the set. During data recording, one of two contiguous blocks is recorded on one of the disc-shaped recording medium of the set, while the other block is recorded on the other disc-shaped recording medium of the set. During data reproduction, the one block is reproduced form the one disc-shaped recording medium, while the other block is reproduced form the other disc-shaped recording medium, thereby to render the accessing speed substantially uniform, that is to average the data transfer rate. The result is that the system performance desired by the user can be realized while cost requirements are satisfied.

DESCRIPTION OF PREFERRED EMBODIMENTS

Figure 1:
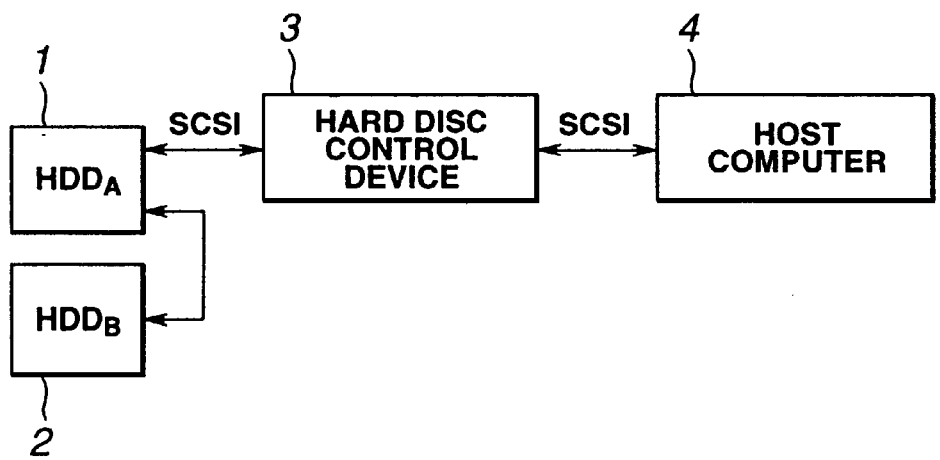
FIG. 1 illustrates an overall system configuration of a system according to an embodiment of the present invention.

Referring to the drawings, preferred embodiments of the present invention will be explained in detail.

FIG. 1 shows an overall configuration of a system to which the disc control device of the present invention (hard disc control device 3) is applied in case of using a hard disc as a disc-shaped recording medium. In the system shown in FIG. 1, the hard disc control device 3 of the present invention controls two hard disc devices of the so-called daisy chain structure, that is a hard disc drive device HDDA 1 and a hard disc drive device HDDB 2. In the embodiment shown in FIG. 1, the interface between a host computer 4 and the hard disc drive device 3 and the interface between the hard disc control device 3 and the hard disc drive devices 1, 2 are each designed as small computer system interface (SCSI). This, however, is merely illustrative and any other interface, such as centronics or IEEE1394, that may be optimum for the system under consideration, may be employed.

Referring to FIG. 1, the host computer 4 sends the control command and the address information, to the hard disc control device 3, which then controls the data recording/reproducing operation by the hard disc drive devices 1, 2 depending on the control command and the address information.

That is, as an illustrative basic operation of the system of FIG. 1, a write command is first sent during data recording from the host computer 4 to the hard disc control device 3. The write address information and the recording data are then sent. The hard disc control device 3, receiving the write command, responds to the command for the host computer 4. The hard disc control device 3 then controls the hard disc drive devices 1, 2, based on the write address information, for recording the recording data on the hard disc within the hard disc drive devices 1, 2.

For data reproduction, a read command, followed by the read address information, is first sent from the host computer 4 to the hard disc drive device 3. The hard disc drive device 3, receiving the read command, responds to the command of the host computer 4 and subsequently controls the hard disc drive devices 1, 2 base on the read address information for reproducing data from the hard disc housed within the hard disc drive devices 1, 2. The playback data reproduced from the hard disc is sent to the host computer 4 via hard disc drive device 3.

Figure 2:
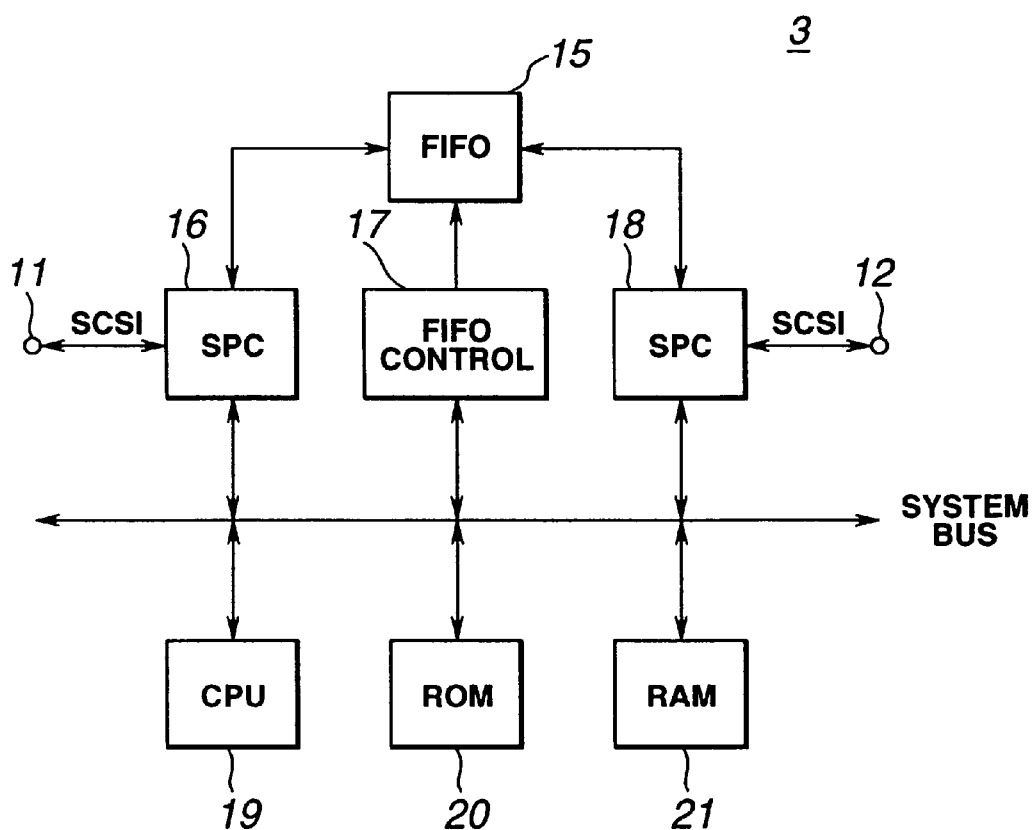
FIG. 2 is a block circuit diagram showing the inner structure of a hard disc device.

The hard disc drive device 3 is configured as shown in FIG. 2.

Referring to FIG. 2, an operating program for the hard disc drive device 3 or a variety of control data are written in a read-only memory (ROM) 20. A central processing unit (CPU) 19 sequentially reads out the program written in the ROM 20 to control the system in accordance with the read-out program. A random-access memory (RAM) 21 is a work RAM for transiently storing various data used in the CPU 19. A SCSI protocol controller (SPC) 16 controls the communication with the host computer 4 via the SCSI interface, whilst the SPC 16 controls the communication with the host computer 4 via SCSI interface. A first-in-first-out (FIFO) memory 15 operates as a buffer for transiently storing data exchanged via the SPCs 16, 18. A FIFO control circuit 17 controls the FIFO memory 15.

As the basic operation of the hard disc drive device 3 of FIG. 2, a write command sent via terminal 12 and SPC 18 from the host computer 4 is sent during recording to the CPU 19. The CPU 19, receiving the write command, generates a reply to the write command, and returns the reply via SPC 18 and terminal 12 to the host computer 4. The CPU 19, receiving the write command, controls the various parts for recording the data in accordance with the program stored in the RAM 20. Specifically, the CPU 19 causes the write address information, supplied next to the write command, to be stored in the RAM 21. The CPU 19 also controls the FIFO control circuit 7 to store the recording data sent from the host computer 4 in the FIFO memory 15. From this FIFO memory 15, the recording data stored therein is read out in terms of a pre-set unit as later explained. The recording data of the pre-set unit are sent via SPC 16 and terminal 11 to the hard disc drive devices 1, 2 for recording on the hard disc based on the write address information.

During data reproduction, the read command supplied via terminal 12 and SPC 18 from the host computer 4 is sent to the CPU 19. On reception of this read command, the CPU 19 generates a response to the read command and returns this response via SPC 18 and terminal 12 to the host computer 4. On reception of the read command, the CPU 19 also controls various parts for data reproduction in accordance with the program stored in ROM 20. Specifically, the CPU 19 causes the read address information, supplied next to the read command, to be stored in, for example, a RAM 21, and then controls the hard disc drive devices 1, 2 in accordance with the read address information for reproducing data in terms of a pre-set unit. The CPU 19 also controls the FIFO control circuit 17 to store in the FIFO memory 15 the playback data reproduced from the hard disc drive devices 1, 2 and which is supplied via SPC 16 and terminal 11 in terms of the pre-set unit. The CPU 19 then controls the FIFO control circuit 17 to read out playback data from the FIFO memory 15. The read-out playback data is transferred via SPC 18 and terminal 12 to the host computer 4.

Figure 3A:
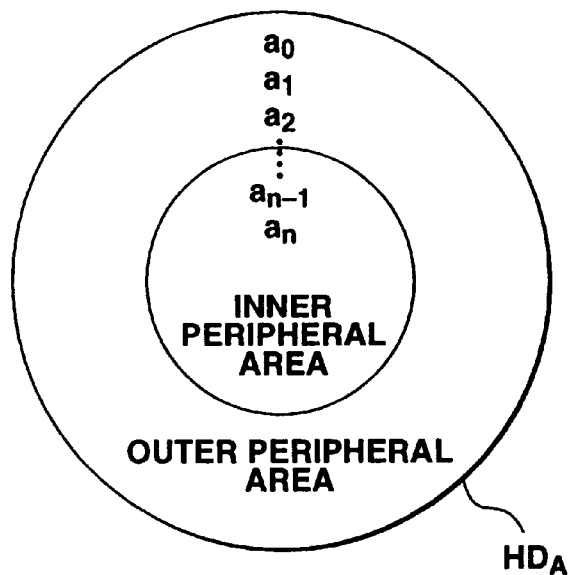
FIGS. 3A–3B illustrate the block address accorded to the hard disc.
Figure 3B:
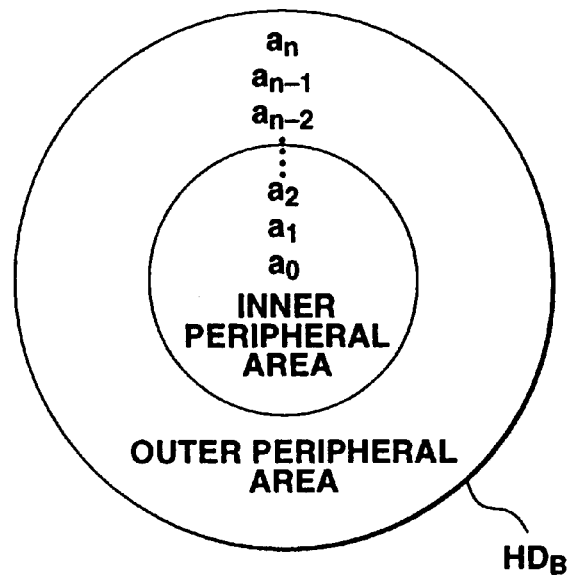

The technique of controlling the recording and reproduction by the hard disc drive device 3 is explained in detail by referring to FIGS. 3A–3B. FIGS. 3A–3B show a recording area of a hard disc housed within the hard disc drive devices 1, 2 as divided from the viewpoint of the inner data transfer rate. That is, the hard disc HDA in the hard disc drive device 1, as shown in FIG. 3B, and the hard disc HDB in the hard disc drive device 2, as shown in FIG. 3B, are both run in rotation at a constant angular velocity, so that the data transfer rate in the inner rim region differs from that in the outer rim region, with the data transfer rate in the inner rim region being slower than that in the outer rim region.

The above-mentioned pre-set unit for the hard disc control device 3 to access the hard discs HDA, HDB is defined as a block. Each block is associated with one of contiguous plural sectors on the hard disc HDA or HDB. The sector address in the hard disc HDA or HDB is assumed to increment from the outer disc rim side towards the inner disc rim side. The number of sectors making up a block is set to a number capable of assuring most efficient accessing in view of the characteristics of the hard disc drive devices 1, 2. The above-mentioned pre-set unit in accessing the hard discs HDA and HDB by the host computer 4 is defined as being a frame. Each frame is of a size equal to a multiple of 2 of the block size. The host computer 4 specifies the frame address and the number of frames for the hard disc control device 3. The hard disc control device 3 generates the block address and the number of blocks from the frame address and the number of frames for accessing the hard disc drive devices 1, 2. If the frame size is the same as the block size, the host computer 4 specifies the frame address and the number of frames with two frames (that is two blocks) as a unit.

Based on this presupposition, the hard disc control device 3 during the above-described data recording and data reproduction accords block addresses a0 to an to the hard disc HDA of the hard disc drive device 1 so that the block addresses will increment from the outer disc rim side towards the inner disc rim side, as shown in FIG. 3A, while according block addresses a0 to an to the hard disc HDB of the hard disc drive device 2 so that the block addresses will increment from the inner disc rim side towards the outer disc rim side, that is in a reverse fashion from the hard disc HDA, as shown in FIG. 3B. However, looking from the host computer 4, the hard disc addresses (frame addresses when viewed from the host computer 4) sequentially increment from the outer disc rim side towards the inner disc rim side, as shown in FIG. 3A. That is, if the host computer 4 has specified the hard disc addresses (frame addresses), the hard disc control device 3 accesses data on the block basis by forward addressing in accordance with the frame addresses for the hard disc HDA, while accessing data on the block basis by addressing reversed from the frame addresses for the hard disc HDB. Thus, in the host computer 4, the hard discs HDA, HDB can be accessed on the basis of the same frame addresses.

Figure 4:
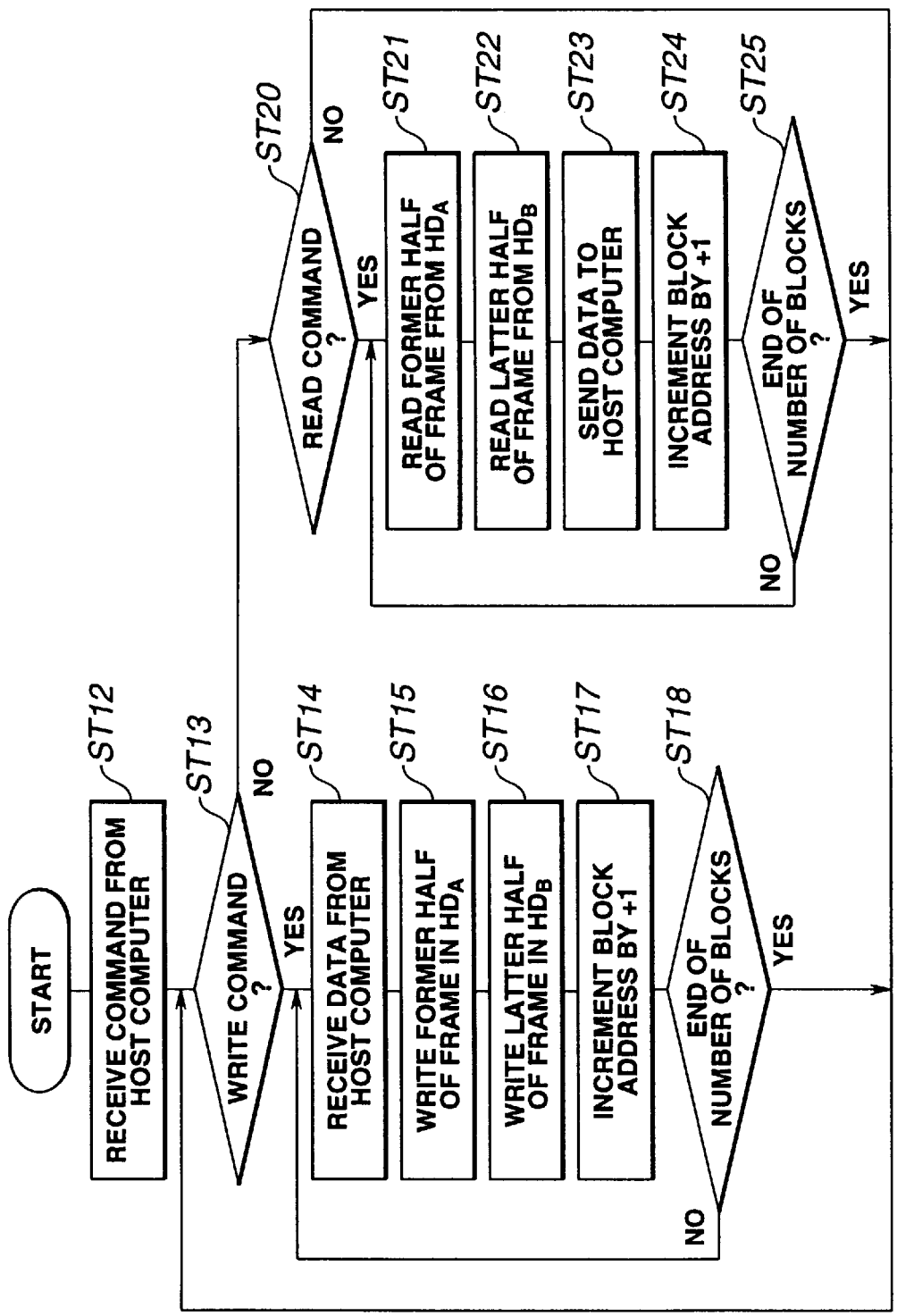
FIG. 4 is a flowchart for illustrating the flow of the operation of the hard disc control device during data recording and data playback.

The operation of the hard disc control device 3 will be more specifically explained by referring to the flowchart of FIG. 4. In the example of FIG. 4, the size of the frame as the accessing unit of the host computer 4 is set so as to be twice the block size.

At step ST12 of FIG. 4, a control command is received from the host computer 4.

At the next step ST13, it is judged whether or not the control command is a write command. If the control command is found at step ST13 to be a write command, processing transfers to step ST14 and, if otherwise, to step ST20.

In the processing of steps ST14 ff., to which processing transfers after reception of the write command, that is during data recording, the host computer 4 is intimated of the effect that the command has been received. In addition, data is received from the host computer 4. The data received at this time from the host computer 4 is the frame addresses during data recording (the above-mentioned write address information), the information specifying the number of frames and the frame-based recording data.

At the next step ST15, the recording data for the former half of the frame is sent as one-block recording data to the hard disc drive device 1, at the same time as the above-mentioned block addresses are generated from the above-mentioned frame addresses and the recording data for the former half of the frame (one-block recording data) is recorded on the hard disc HDA on which the block addresses a0 to an are accorded for incrementing from the outer disc rim side to the inner disc rim side as shown in FIG. 3A. That is, the recording data are recorded in the order of the increasing block addresses. As for the sectors in a block, recording is in accordance with the sector addresses incrementing from the outer disc rim side towards the inner disc rim side, as described previously.

At the next step ST16, the recording data for the latter half of the frame is sent as one-block recording data to the hard disc drive device 2, at the same time as the above-mentioned block addresses are generated from the above-mentioned frame addresses and the recording data for the latter half of the frame (one-block recording data) is recorded on the hard disc HDB on which the block addresses a0 to an are accorded for incrementing from the inner disc rim side to the outer disc rim side as shown in FIG. 3B. That is, the recording data are recorded in the order of the increasing block addresses. As for the sectors in a block, recording is in accordance with the sector addresses incrementing from the outer disc rim side towards the inner disc rim side, as described previously.

Then, at step ST17, the block address is incremented by one. At step ST18, it is judged whether or not recording has come to a close for all blocks corresponding to the number of frames specified by the host computer 4. Here, the number of the blocks corresponds to twice the number of frames. If the processing is judged to have not come to a close, processing reverts to step ST14 to repeat the processing as from the step ST14 ff. If the processing is judged to have come to a close, processing reverts to step ST13 to execute processing as from step ST13 ff.

Thus, during data recording, the hard disc control device 3 divides the frames F1 to F4, sequentially supplied from the host computer 4, into each two former and latter half blocks, namely blocks (bA1, bB1), (bA2, bB2), . . . , (bA4, bB4), on the frame basis, and sends the data of the blocks bA1, bA2, . . . , bA4 of the former half frame to the hard disc drive device 1, while sending the data of the blocks bB1, bB2, . . . , bB4 of the latter half frame to the hard disc drive device 2. Data of the blocks, obtained on bisecting a frame, are alternately recorded from the outer disc rim side and from the inner disc rim side for the hard discs HDA and HDB, respectively.

At step ST20, to which processing transfers if the control command received from the host computer 4 is judged at step ST13 to be not a write command, it is judged whether or not the control command is a read command. If the control command has been found at step ST20 to be a read command, processing transfers to step ST21 and, if otherwise, to step ST13.

In the processing after step ST21, to which processing transfers on reception of the read command, that is during data reproduction, the response stating that the command has been received is returned to the host computer 4. Moreover, data is reproduced from the hard disc drive devices 1, 2 based on the frame address during reproduction of the data received from the host computer 4 (the above-mentioned read address information) and the information specifying the number of frames. Specifically, at step ST21, the block addresses associated with the former half of the frame are generated from the frame address received from the host computer 4 and data associated with the block addresses are reproduced from the hard disc HDA to which the block addresses a0 to an are accorded for incrementing from the outer disc rim side to the inner disc rim side as shown at A in FIG. 3. The sector addresses in the block increment from the outer disc rim side to the inner disc rim side, as explained previously.

At step ST22, the block addresses associated with the latter half of the frame are generated from the frame address received from the host computer 4 and data associated with the block addresses are reproduced from the hard disc HDB to which the block addresses a0 to an are accorded for incrementing from the inner disc rim side to the outer disc rim side as shown at B in FIG. 3. The sector addresses in the block similarly increment from the outer disc rim side to the inner disc rim side, as explained previously.

Figure 5:
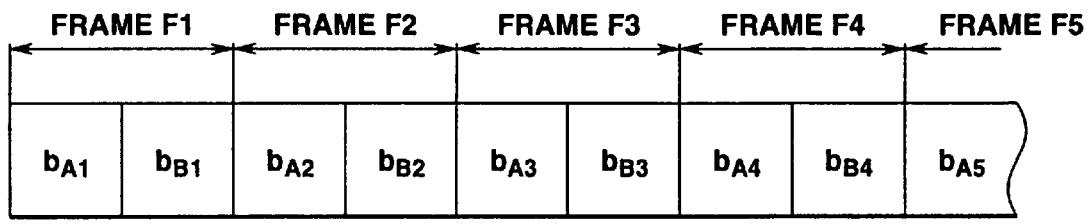
FIG. 5 illustrates the structure of a frame and a block.

At the next step ST23, the playback data reproduced from the hard disc HDA and the hard disc HDB in association with the same frame addresses are connected to each other to generate frame data shown in FIG. 5. This frame data is transferred to the host computer 4.

Then, at step ST23, the block address is incremented by one. At step ST25, it is judged whether or not reproduction has come to a close for all blocks corresponding to the number of frames specified by the host computer 4. Here, the number of the blocks corresponds to twice teh number of frames. If the processing is judged to have not come to a close, processing reverts to step ST21 to repeat the processing as from the step ST21 ff. If the processing is judged to have come to a close, processing reverts to step ST13 to execute processing as from step ST13 ff.

Thus, during data reproduction, the hard disc control device 3 connects data of the blocks (bA1, bB1), (bA2, bB2), . . . , b(A4, bB4), alternately reproduced from the outer disc rim side of the hard disc HDA an from the inner disc rim side of the hard disc HDB, using the same block address generated from the sole frame address, for generating frames F1 to F4, which are transferred to the host computer 4.

With the present system, as described above, a given frame is divided into two blocks during data recording, and one of the block data is recorded beginning from the outer rim of the hard disc HDA, while the other block data are recorded beginning from the inner rim side of the hard disc HDB. Conversely, during data reproduction, the block data reproduced from the hard disc HDA and that reproduced fro the hard disc HDB are interconnected to generate a frame, so that the accessing speed as seen from the host computer 4 becomes substantially uniform for any frame addresses.

Figure 6:
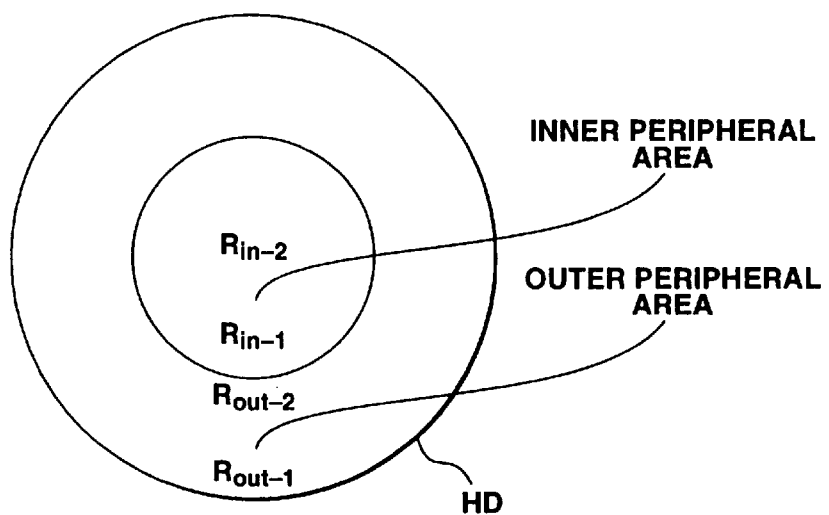
FIG. 6 illustrates setting a uniform data transfer rate.

That is, if, as show in FIG. 6, the data transfer rates in the inner rim areas of the hard discs HD are R in-2 and R in-2, while those in the outer rim areas of the hard discs HD are R out-1 and R out-2, the difference in the accessing rate as viewed from the host computer 4 becomes (R out-1+R in-2)/2−(R out-2+R in-1)/2, thus becoming approximately equal for any frame addresses. With the conventional hard disc device, the difference in the accessing speed as viewed from the host computer 4 becomes R out-1−R in-2, which is significantly different from the value of the present system. As a more specified example, in a hard disc device having the inner rim side data transfer rate of 47.5 Mbps and the outer rim side data transfer rate of 72 Mbps, the data transfer rate of (72+47.5)/2=59.75 Mbps is realized in accordance with the present invention. If the slower rate, for example, is taken as a reference, as in the conventional technique, the data transfer rate is 47.5 Mbps. Meanwhile, the time required in the above accessing is the sum of the seek time, queue time for disc rotation and the transfer time plus protocol overhead time, while the transfer time is equal to the data transfer rate multiplied by the amount of the transferred data.

Figure 7:
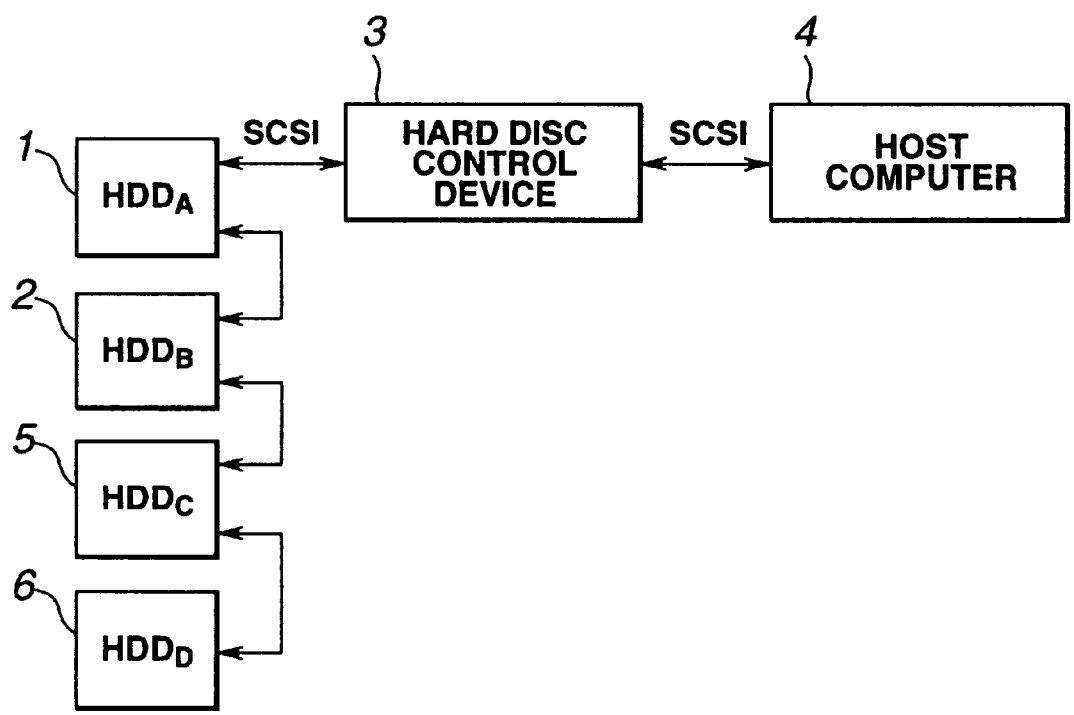
FIG. 7 illustrates an overall system configuration of a system according to a modified embodiment of the present invention.

The configuration shown in FIG. 7 also may be contemplated as a system according to a modification.

In the configuration of FIG. 7, there are four hard disc driving devices HDDA 1, HDDB 2, HDDC 3 and HDDD 6, each designed as a so-called daisy-chain structure. These four hard disc driving devices are controlled by the hard disc control device 3 of the present invention. In the embodiment of FIG. 7, the interface between the host computer 4 and the hard disc control device 3 and the interface between the hard disc control device 3 and the hard disc drive devices 1, 2, 5 and 6 are designed as SISC. This, however, is merely illustrative and an optimum interface for the system under consideration may be employed.

It is assumed in the hard disc control device 3 of the system shown in FIG. 7 that the size of a frame as an accessing unit of the host computer 4 is four times as large as the block size. The hard disc drive devices 1, 2 are controlled as in FIG. 1, while the hard disc drive device 5 is controlled similarly to the hard disc drive device 1 and the hard disc drive device 6 is controlled similarly to the hard disc drive device 2.

In the system of FIG. 7, similarly to the system of FIG. 1, the accessing speed as viewed from the host computer 4 can be rendered substantially uniform for any frame addresses.

If, in the above-described embodiments, a malfunctioning sector occurs during data recording such that it becomes necessary to accord an exchange sector, control may be managed for re-allocating a sector in the vicinity of the malfunctioning sector. Alternatively, control may be managed for re-allocating a block in the same neighboring area. This enables a substantially uniform accessing speed despite occurrence of malfunctioning portions in the recording medium.

In the above-described embodiments, such a hard disc driven with a constant angular velocity, that is a hard disc in which the data transfer rate on the inner disc rim side is different from that on the outer disc rim side, is taken as an example of a disc-shaped recording medium having areas with different data transfer rates. The present invention, however, may be applied to an optional disc-shaped recording medium, other than the above-mentioned hard disc, having a disc transfer rate on the inner disc rim side different from that on the outer disc rim side. The present invention may also be applied to an optical disc, a magneto-optical disc or to a phase-transition optical disc which usually is run in rotation at a constant linear velocity but which occasionally is run in rotation at a constant angular velocity.

In the above-mentioned embodiments, a sole hard disc is provided within one and the same hard disc drive device. The present invention may, however, be applied to an instance in which plural hard discs are provided within one and the same hard disc drive device.

With the present system, as described above, the accessing speed as viewed from the host computer 4 becomes substantially uniform for any frame address, so that the system performance particularly desired by a user may be obtained, while cost requirements may also be met. If video or audio data are contained in data under consideration, these video or audio data are required to be recorded/reproduced in real-time, thus imposing the necessity for securing a constant transfer rate. The present invention can be applied with advantage to accessing the video and audio data.

What is claimed is:

1. A disc system for accessing data on a disc-shaped recording medium driven at a constant angular velocity, in terms of a pre-set block as a unit, comprising:

a plurality of first disc-shaped recording mediums to which are accorded addresses incrementing from the outer disc rim side;

a plurality of second disc-shaped recording mediums to which are accorded addresses incrementing from the inner disc rim side;

wherein the recording mediums are handled in a set, such that an even number of disc-shaped recording mediums made up of a number of said first disc-shaped recording mediums and the same number of said second disc-shaped recording mediums if data is recorded or reproduced for said disc-shaped recording mediums; and accessing control means for controlling the reproduction/recording of data from/to at least one of said first disc-shaped recording mediums such that as data is reproduced/recorded from/to a first disc-shaped recording medium on the block basis, the direction radial progression of the reproduced/recorded blocks proceeds from the outer disc rim side of said first disc-shaped recording medium to the inner disc rim side of said first disc-shaped recording medium, and for controlling the reproduction and recording of data from/to at least one of said second disc-shaped recording mediums such that as data is reproduced/recorded from/to a second disc-shaped recording medium on the block basis, the direction of radial progression of the reproduced/recorded blocks proceeds from the inner disc rim side of said second disc-shaped recording medium to the outer disc rim side of said second disc-shaped recording medium; wherein substantially one-half of the accessed data is done for said first disc-shaped recording mediums and the substantially remaining half of the accessed data is done for the second disc-shaped recording mediums.

2. The disc system as claimed in claim 1 wherein the data recorded/reproduced for said disc-shaped recording mediums include video and audio data.

3. The disc system as claimed in claim 1 wherein said set of the even number of the disc-shaped recording mediums is made up of a sole first disc-shaped recording medium and a sole second disc-shaped recording medium.

4. The disc system as claimed in claim 1 wherein data accessing to the first and second disc-shaped recording mediums is performed from the outer disc rim side of the first disc-shaped recording medium and from the inner disc rim side of the second disc-shaped recording medium using the same block addresses generated on the basis of the same addresses accorded by a host computer.

5. The disc system as claimed in claim 1 wherein said disc-shaped recording mediums are interconnected in a daisy-chain configuration.

6. The disc system as claimed in claim 1 wherein, if a malfunctioning portion occurs during data recording on a disc-shaped recording medium, control is managed for re-allocating an area neighboring to the malfunctioning portion as a recording area.

7. A disc control method for effectuating data accessing, in terms of a pre-set block as a unit, to an even number of first disc-shaped recording mediums and the same number of second disc-shaped recording mediums, driven at a pre-set angular velocity, comprising:

(a) receiving an address for data accessing from a host computer;

(b) generating a block address based on said address; and (c) controlling the reproduction/recording of data from/to at least one of said first disc-shaped recording mediums such that as data is reproduced/recorded from/to a first disc-shaped recording medium on the block address basis, the direction of radial progression of the reproduced/recorded blocks proceeds from the outer disc rim side of said first disc-shaped recording medium to the inner disc rim side of said first disc-shaped recording medium, and controlling the reproduction and recording of data from/to at least one of said second disc-shaped recording mediums such that as data is reproduced/recorded from/to a second disc-shaped recording medium on the block address basis, the direction of radial progression of the reproduced/recorded blocks proceeds from the inner disc rim side of said second disc-shaped recording medium to the outer disc rim side of said second disc-shaped recording medium; wherein substantially one-half of the data accessing commanded by the host computer is done for said first disc-shaped recording mediums and the substantially remaining half of the data accessing is done for said second disc-shaped recording mediums.

8. The disc control method as claimed in claim 7 wherein the data recorded/reproduced for said disc-shaped recording mediums include video and audio data.

9. A disc control method for effectuating data accessing to a first disc-shaped recording medium and a second disc-shaped recording medium, both of which are driven at a constant angular velocity, in terms of a pre-set block as a unit, comprising:

(a) receiving an address for data accessing from a host computer;

(b) generating a block address based on said address; and (c) controlling the reproduction/recording of data from/to said first disc-shaped recording medium such that as data is reproduced/recorded from/to said first disc-shaped recording medium on the block address basis, the direction of radial progression of the reproduced/recorded blocks proceeds from the outer disc rim side of said first disc-shaped recording medium to the inner disc rim side of said first disc-shaped recording medium, and controlling the reproduction/recording of data from/to said second disc-shaped recording medium such that as data is reproduced/recorded from/to said second disc-shaped recording medium on the block address basis, the direction of radial progression of the reproduced/recorded blocks proceeds from the inner disc rim side of said second disc-shaped recording medium to the outer disc rim side of said second disc-shaped recording medium; wherein, substantially one-half of the data accessing commanded by the host computer is done for said first disc-shaped recording medium and the substantially remaining half of the data accessing is done for said second disc-shaped recording medium.

* * * * *